United States Patent
Suzue

(10) Patent No.: US 8,503,009 B2
(45) Date of Patent: Aug. 6, 2013

(54) ENABLING COMMUNICATION WITH A PRINT CONTROLLER THROUGH MULTIPLE COMMUNICATION LINKS

(75) Inventor: Tadashi Suzue, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 938 days.

(21) Appl. No.: 12/416,265

(22) Filed: Apr. 1, 2009

(65) Prior Publication Data
US 2009/0251726 A1    Oct. 8, 2009

(30) Foreign Application Priority Data

Apr. 7, 2008    (JP) ................................ 2008-098940

(51) Int. Cl.
*G06F 3/12*    (2006.01)

(52) U.S. Cl.
USPC ........................................................ 358/1.15

(58) Field of Classification Search
USPC ........................................................ 358/1.15
See application file for complete search history.

(56) References Cited

U.S. PATENT DOCUMENTS

| | | | |
|---|---|---|---|
| 6,886,028 B1 | 4/2005 | Matsuyama et al. | |
| 2006/0061813 A1* | 3/2006 | Kuroda et al. | 358/1.15 |
| 2006/0087675 A1 | 4/2006 | Terada et al. | |
| 2006/0158674 A1 | 7/2006 | Mizoguchi | |
| 2008/0043137 A1 | 2/2008 | Rikima et al. | |

FOREIGN PATENT DOCUMENTS

| | | |
|---|---|---|
| JP | 10-269039 | 10/1998 |
| JP | 2005-292999 A | 10/2005 |

OTHER PUBLICATIONS

European Search Report issued in the corresponding European Application No. 09157165.3-1228 dated May 3, 2010.
Notice of Reasons for Refusal issued in the corresponding Japanese Patent Application No. 2008-098940 dated Feb. 5, 2010, and an English Translation thereof.

* cited by examiner

*Primary Examiner* — Eric A Rust
(74) *Attorney, Agent, or Firm* — Buchanan Ingersoll & Rooney PC

(57) ABSTRACT

An image forming system includes: a print controller which generates image data based on a print job; and an image forming apparatus which controls the print controller and performs a printing operation based on the image data, wherein the image forming apparatus includes: a first interface section which connects with a first line for receiving the image data from the print controller; a second interface which connects with a second line with which a client can connect, the second line for communicating with the print controller; and a control section which executes a first control which, through the first line, executes an initial setting which enables the print controller to be used through the second line, and a second control which executes of the print controller after the initial setting is executed through the second line.

15 Claims, 7 Drawing Sheets

10: IMAGE FORMING SYSTEM

70: PRINT CONTROLLER CONTROL SCREEN

71: WEB PAGE DISPLAY AREA

10: IMAGE FORMING SYSTEM

ENABLING COMMUNICATION WITH A PRINT CONTROLLER THROUGH MULTIPLE COMMUNICATION LINKS

RELATED APPLICATION

This application is based on Japanese Patent Application No. 2008-098940 filed on Apr. 7, 2008 in Japanese Patent Office, the entire content of which is hereby incorporated by reference.

FIELD OF THE INVENTION

The present invention relates to an image forming system and a control method, particular to an image forming system including an image forming apparatus and print controller, and a control method of the print controller in this image forming system.

BACKGROUND OF THE INVENTION

There has been a widespread use of the printing apparatus (hereinafter referred to as "image forming apparatus) of a multi-functional peripheral provided with a printer function and a scanner function. When this mage forming apparatus is used for printing operation, a print job of page description language (PDL: Page Description Language) format is received from the client linked to the network, and the print job is raterized (bit map expansion) to generate multivalued (e.g., 8 bits) image data. This multivalued image data is screened (binarized) to generate binary image data, and image adjustment processing is applied to the binary image data, which is then outputted onto a paper medium.

In the system connected with a plurality of image forming apparatuses via the network, if the process of generating multivalued image data from a print job (hereinafter referred to as "RIP (Raster Image Processor) processing") or the process of screening the multivalued image data is to be performed in each image forming apparatus, each image forming apparatus is required to have the functions of performing the above-mentioned processes. This will result in a complicated structure of the image forming apparatus. To avoid this, this system is designed in such a structure that a print controller provided with the above-mentioned RIP processing function and screening function is linked with the network, and the print controller exclusively takes charge of the above-mentioned processes (e.g., Japanese Unexamined Patent Application Publication No. 2005-292999).

FIG. 8 schematically shows the structure of the image forming system provided with such a print controller. A client 40 and print controller 30 are connected via such a second line 60 as LAN (Local Area Network) or WAN (Wide Area Network), while a print controller 30 and image forming apparatus 20 are connected via such a first line 50 as a dedicated bus.

The print controller 30 receives a print job of page description language format from the client 40 through the second line 60, and applies RIP processing or screening processing. The binary image data and job ticket are then sent to the image forming apparatus 20 via the first line 50. In the image forming apparatus 20, image adjustment processing is applied to the binary image data, and printing is carried out.

Normally, the print controller 30 is not provided with a display section or operation section. Thus, the panel of the image forming apparatus 20 must be used to set the IP (Internet Protocol) address of the print controller 30, to register the information of the image forming apparatus 20 or user information into the print controller 30, to control the print job, and to update the program of the print controller 30. This involves the following problems:

In the first place, when the print controller 30 is controlled from the panel of the image forming apparatus 20, the control signal (command code) is transferred via the first line 50 such as the above-mentioned dedicated bus. This first line 50 is a line used to transfer the image data when the print job is executed. Accordingly, the image data concurs with the command code in the first line 50 and image data transfer performance is reduced, with the result that effective printing operation cannot be performed.

Further, when the screen for controlling the print controller 30 is to be displayed on the panel of the image forming apparatus 20, if screen data is sent from the print controller 30 to the image forming apparatus 20 via the first line 50, the image data competes with the screen data in the first line 50, and the image data transfer performance is further reduced. Moreover, a special-purpose GUI (Graphical User Interface) is mounted on the image forming apparatus 20, and the screen suited for the control of each print controller 30 is created by the image forming apparatus 20. Use of such a structure will increase the number of man hours for designing the screen, and a bug will be produced by differences in the program interface. Further, this structure will make it difficult to modify the screen structure after shipment of the image forming apparatus 20, and the screen will have to be created again when the print controller 30 is modified. These problems will arise to cause difficulties in the effective control of the print controller.

In view of the problems described above, it is the major object of the present invention to provide an image forming system and control method capable of efficient printing operation and effective control of the print controller.

SUMMARY OF THE INVENTION

One aspect of the present invention is an image forming system provided with a print controller for generating image data based on a print job, and an image forming apparatus for performing printing operations based on the aforementioned image data wherein the aforementioned print controller is controlled by the image forming apparatus; this image forming system being further characterized in that the image forming apparatus includes: a first interface section for connection with the first line to receive the image data from the print controller: a second interface section for connection with the second line to communicate with the print controller, the second interface section being connectable with a client that sends the print job; and a controller that executes the first control for conducting initial setting to use the print controller on the second line through the first line, and the second control for controlling the print controller subsequent to the initial setting through the second line.

Another aspect of the present invention is a control method of an image forming system which comprises a print controller for generating image data based on a print job; and an image forming apparatus for performing a printing operation based on the image data, which controls the print controller, the method comprising: connecting the print controller with the image forming apparatus through a first line which transfers the image data and a second line which a client who sends the print job can connects; executing an initial setting by using the first line for enabling the print controller to be used through the second line; executing a control of the print controller after the initial setting by using the second line.

And another aspect of the present invention is an image forming apparatus which connects with a print controller which generates image data based on a print job, performs a printing operation based on the image data, and controls the print controller, the image forming apparatus comprising: a first interface section which connects with a first line for receiving the image data from the print controller; a second interface which connects with a second line with which a client can connect, the second line for communicating with the print controller; and a control section which executes, a first control which, through the first line, executes an initial setting which enables the print controller to be used through the second line, and a second control which executes of the print controller after the initial setting is executed through the second line.

DESCRIPTION OF THE PREFERRED EMBODIMENT

Figure 1:
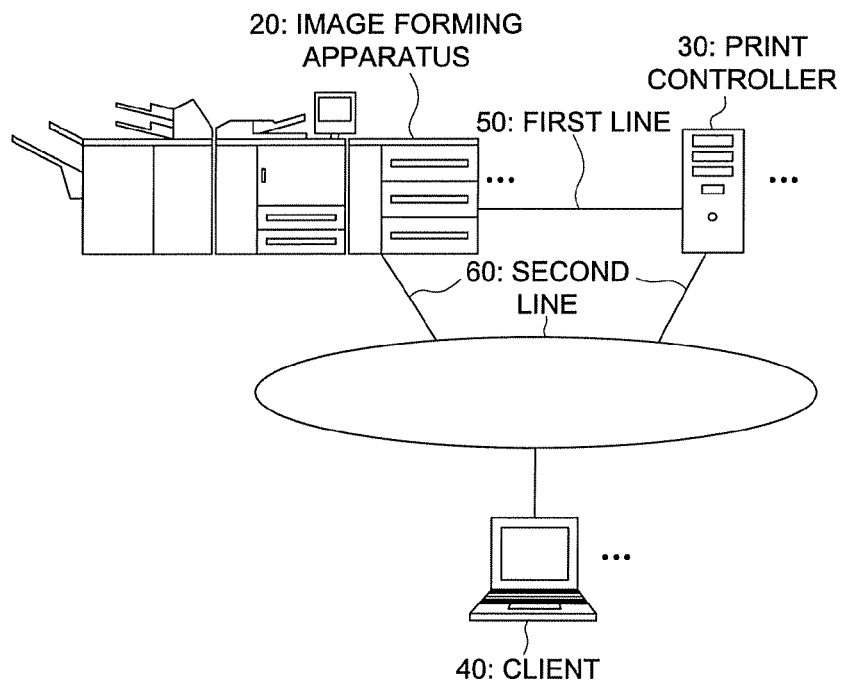
FIG. 1 is a diagram schematically representing one structure of an image forming system in one example of the present invention.

As described above with reference to the background of the invention, when a print controller is installed, a client and print controller are connected via a second line such as LAN or WAN, while a print controller and image forming apparatus are linked via the first line such as a dedicated bus. Since the print controller has no other UI (User Interface) than panel of the image forming apparatus, a command code is transferred via a dedicated bus to perform various forms of settings.

If the capacity of the command code increases in proportion to the amount of the contents having been set, the image data transfer speed will be reduced in the dedicated bus and printing operation will be delayed. This will also cause an UI to be created in conformity to each print controller or will increase the number of man hours required to design a screen or to modify the design. This will also require an UI to be created in conformity to the same command contents in both the print controller and image forming apparatus, with the result that a resulting operation failure is likely to occur.

To solve the aforementioned problems, in the present invention, the print controller and image forming apparatus are connected via a first line such as a dedicated bus. Not only that, a second line such as LAN or WAN is also used for this connection. Then a Web server is mounted on the print controller, and a Web browser is mounted on the image forming apparatus so that the print controller can be controlled using the second line. Further, the screen for controlling the print controller is created by the print controller—not by the image forming apparatus—, and the aforementioned screen is displayed by the Web browser function of the image forming apparatus.

This arrangement minimizes the contention between the command code and image data in the first line such as a dedicated bus, and enhances the efficiency in printing operations. This arrangement also eliminates the need of creating a screen by the image forming apparatus, and contributes to a substantial reduction in the number of man hours for creating an UI or for ensuring command consistency.

In the above-mentioned configuration, the basic setting including the IP address required by the Web browser must be performed on the operation section of the image forming apparatus. Further, the screen for controlling the print controller is designed for use with a conventional high-function PC browser. The browser of limited functions mounted on the image forming apparatus may fail to meet the display requirements fully.

Thus, when the print controller is connected, the basic setting (what is called initial setting) including the IP address is performed using the first line such as a dedicated bus. In this case, the screen data for initial setting is stored in the storage section of the image forming apparatus.

When the print job is set on the image forming apparatus, information on the connection of the print controller is checked. If the initial setting is not yet completed, the setting is prompted. If initial setting has been completed, the Web browser is booted, and the Web page of the print controller is specified and notified to the URL (Uniform Resource Locator) so that the screen is display and connection is started.

When there is access to the Web browser from the relevant image forming apparatus, the Web server of the print controller returns the page contents in conformity to that Web browser. For example, the command code to be sent from the image forming apparatus to the print controller is designed to contain the information (e.g., tag, image format and CGI (Common Gateway Interface)) that can be displayed on the Web browser. This arrangement allows the print controller to identify the Web browser function of the image forming apparatus and to send appropriate Web page as a reply.

Further, the image forming apparatus can retain the basic setting information including the ID information of the print controller connected, as well as the information on the current status of connection. The command code, for example, at the time of re-installation of the print controller can be automatically sent again, and the screen set by the Web browser can be used, without explicit setting by the user

EXAMPLE

Figure 2:
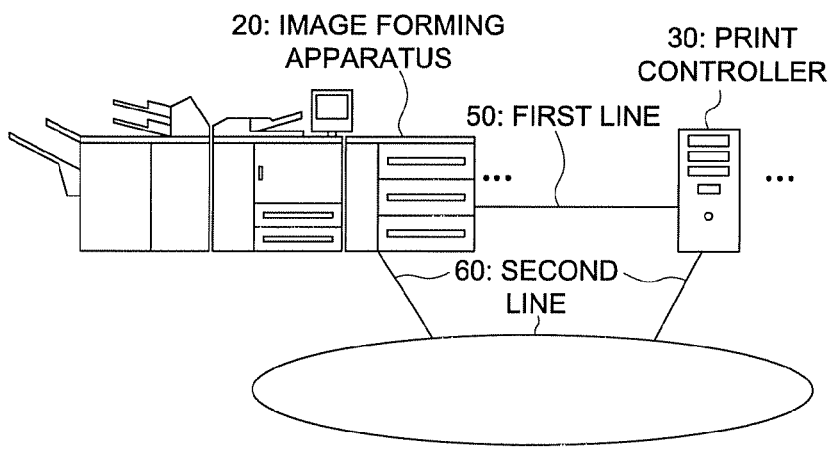
FIG. 2 is a diagram schematically representing another structure of an image forming system in one example of the present invention.
Figure 3:
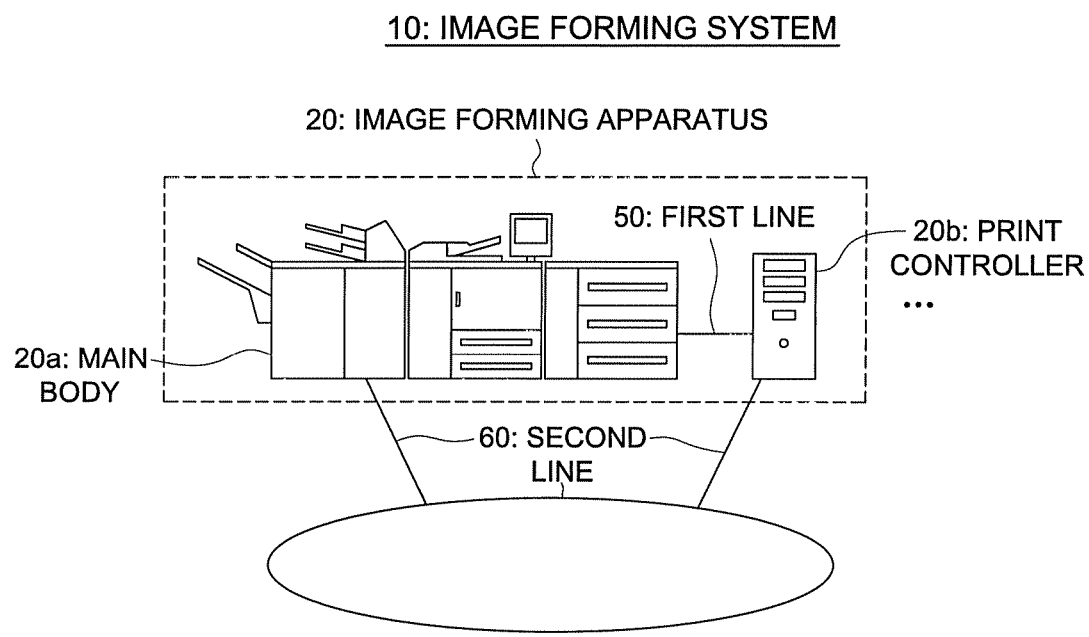
FIG. 3 is a diagram schematically representing a further structure of an image forming system in one example of the present invention.
Figure 4:
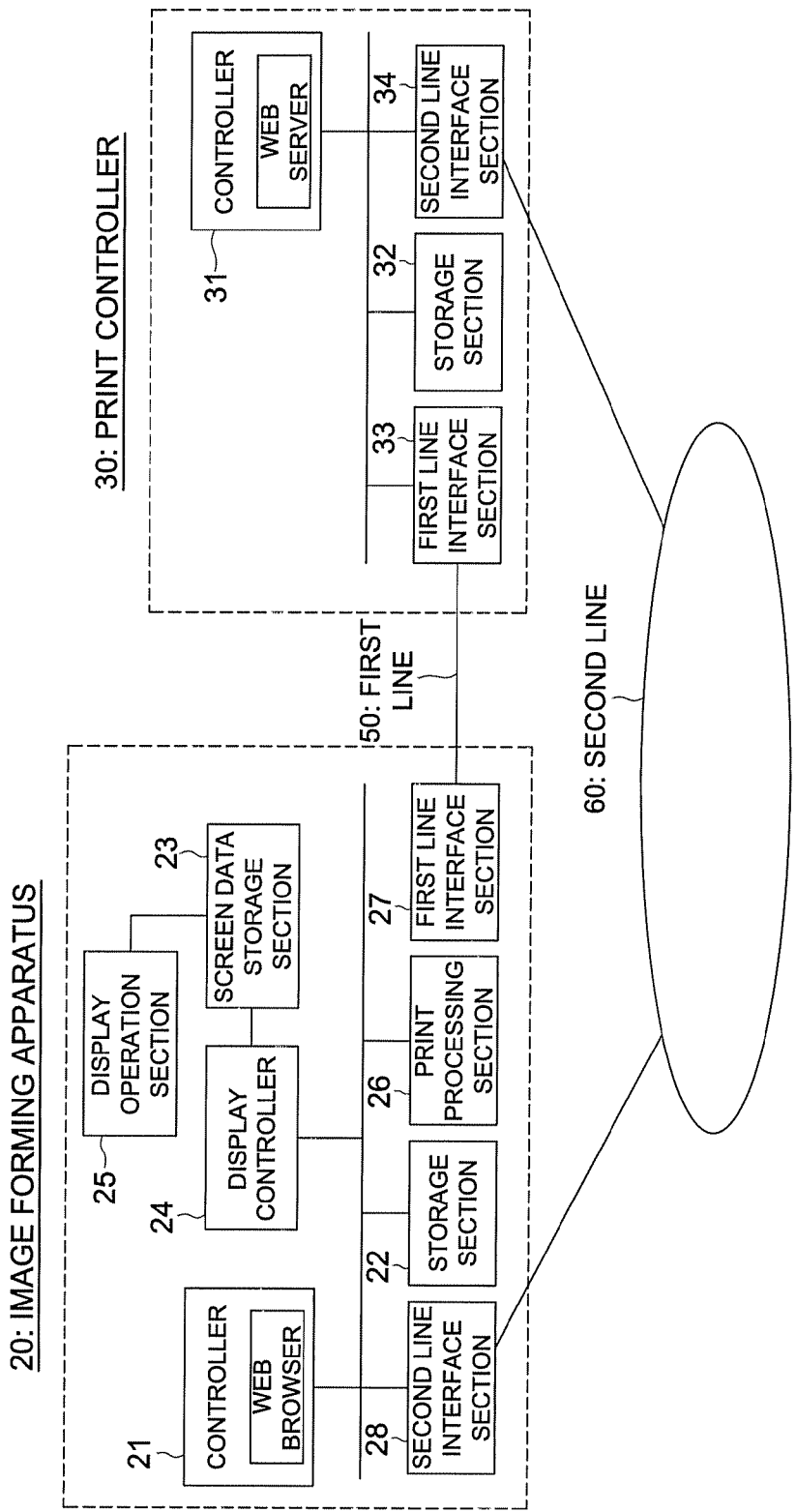
FIG. 4 is a block diagram representing a specific structure of a print controller and image forming apparatus in one example of the present invention.
Figure 5:
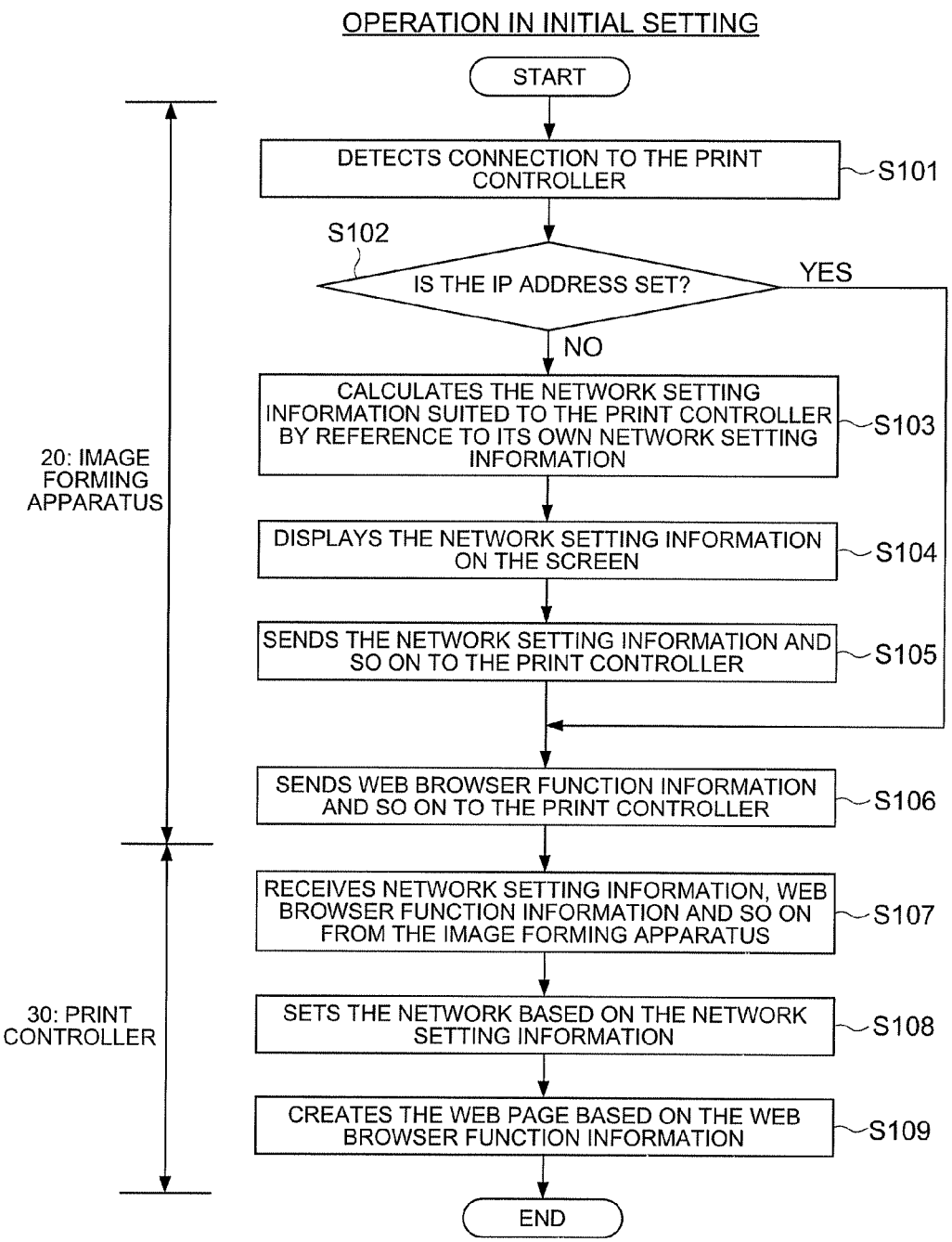
FIG. 5 is a flow chart showing the operation in the initial setting of the print controller of the image forming system in one example of the present invention.
Figure 6:
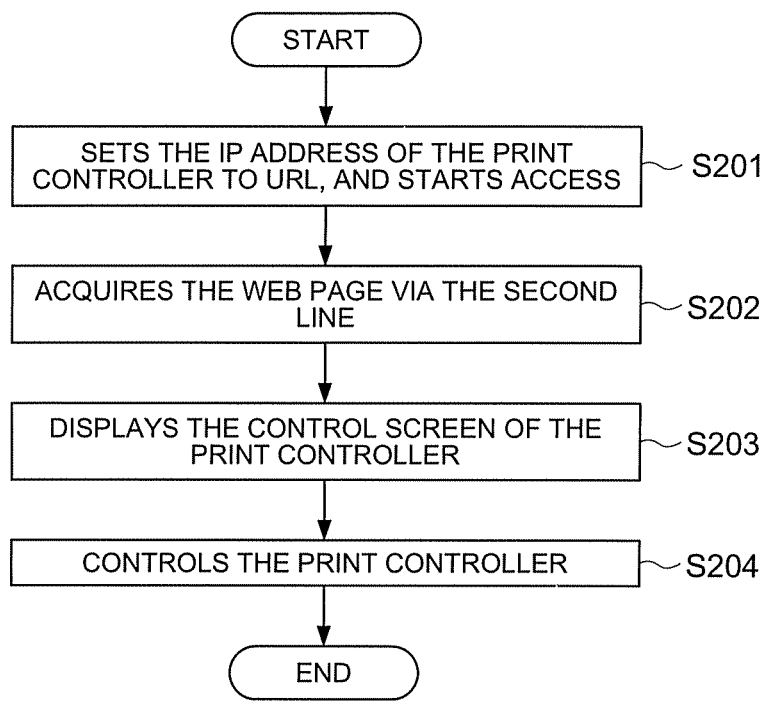
FIG. 6 is a flow chart showing the operation under the control of the print controller of the image forming system in one example of the present invention.

To demonstrate the further details of the embodiment of the present invention, the following describes the image forming system and control method as an example of the present invention with reference to FIGS. 1 through 7. FIGS. 1 through 3 are diagrams schematically representing the structure of an image forming system of this example. FIG. 4 is a block diagram representing a specific structure of a print controller and image forming apparatus. FIG. 5 is a flow chart showing the operation in the initial setting of the print controller. FIG. 6 is a flow chart showing the operation under the control of the print controller of the image forming system.

Figure 7:
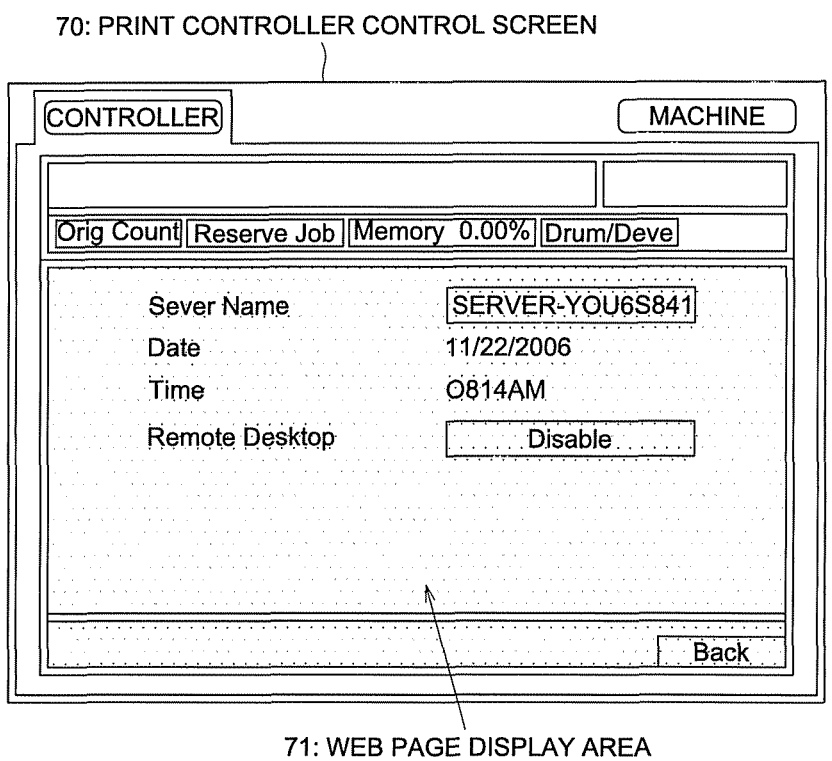
FIG. 7 is a diagram showing an example of the configuration of the print controller control screen displayed on the image forming apparatus in one example of the present invention.
Figure 8:
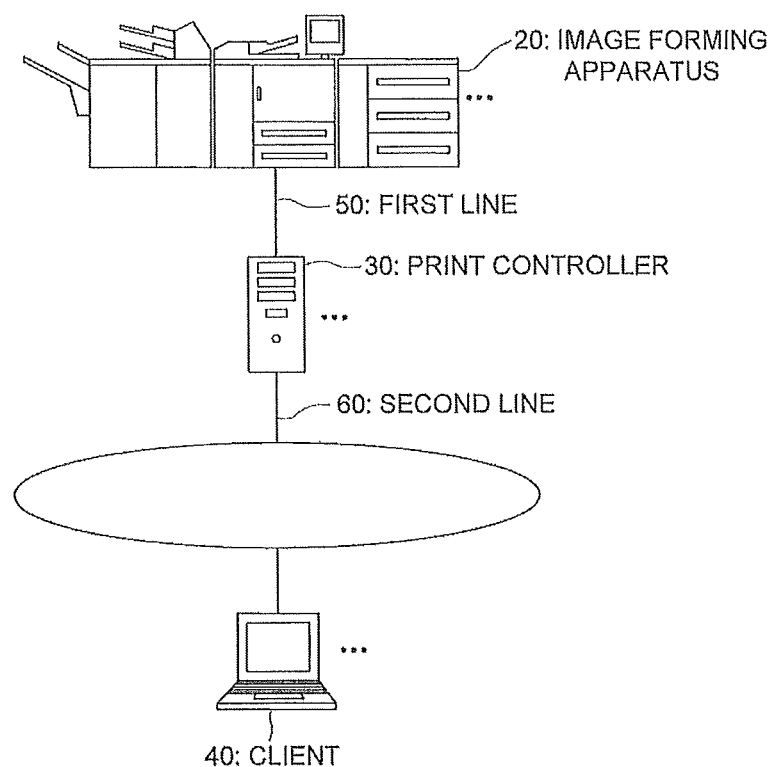
FIG. 8 is a diagram schematically representing the configuration of a conventional image forming system.

FIG. 7 is a diagram showing an example of the configuration of the print controller control screen displayed on the image forming apparatus.

As shown in FIG. 1, the image forming system 10 in this example includes a client 40, print controller 30 and image forming apparatus 20. These components are connected via the second line 60 such as LAN or WAN, while the print controller 30 and image forming apparatus 20 are connected via the first line 50 such as a dedicated bus. The following describes the details of each component:

[Client]

The client 40 is a computer device, and creates a print job of PDL format using a printer driver. Then the second line 60 is used to send this print job to the print controller 30.

[Print Controller]

As shown in FIG. 4, the print controller 30 includes a controller 31, storage section 32, first line interface section 33 and the second line interface section 34.

The controller 31 includes a CPU (Central Processing Unit), RAM (Random Access Memory) and ROM (Read Only Memory). It applies RIP processing or screening to the print data obtained from the client 40, whereby image data is generated. Further, the controller 31 serves the functions of a Web server such as an HTTP (Hypertext Transfer Protocol) server that creates screen data for controlling the print controller 30, converts the screen data into a predetermined format (e.g., HTML (Hypertext Markup Language) format), and supplies this data in the form of a Web page.

The storage section 32 is made of an HDD (Hard Disk Drive) and others, and serves to store the print job obtained from the client 40 and the image data sent to the image forming apparatus 20.

The first line interface section 33 constitutes an interface for connection to the first line 50, and communicates with the image forming apparatus 20 in conformity to the standards such as PCI (Peripheral Components Interconnect).

The second line interface section 34 constitutes an interface of the NIC (Network Interface Card) or modem for connection to the second line 60, and communicates with the client 40 and image forming apparatus 20 in conformity to the standards of the Ethernet (registered trademark).

[Image Forming Apparatus]

As shown in FIG. 4, the image forming apparatus 20 includes a controller 21, storage section 22, screen data storage section 23, display controller 24, display operation section 25, print processing section 26, the first line interface section 27 and second line interface section 28.

The controller 21 includes a CPU, RAM and ROM, and applies processing of compression, decompression, enlargement, reduction and rotation to the image data obtained from the print controller 30. Further, the controller 21 serves as a Web browser that obtains a Web page from the print controller 30.

The storage section 22 is made of an HDD and others, and stores the processed image data, the setting information of the image forming apparatus 20, and user information.

The screen data storage section 23 includes a VRAM (Video Random Access Memory) and stores the screen data to perform setting (e.g., IP address setting, and registration of the information of the image forming apparatus 20 and user information, hereinafter referred to as "initial setting") that allows the print controller 30 to be used via the second line 60, and the screen data obtained from the print controller 30 using the Web browser.

The display controller 24 controls the display operation section 25, and can be exemplified by an LCD (Liquid Crystal Display) controller.

The display operation section 25 is composed of a pressure sensitive operation section (touch panel) having transparent electrodes arranged in a grid-like configuration, wherein this pressure sensitive operation section is mounted on the LCD or organic EL (electroluminescence) display. The X-Y coordinates at the point wherein force is applied by depression with a finger or a touch pen are detected in terms of the current value, and the position signal having been detected is outputted as an operation signal into the controller 21.

The print processing section 26 transfers the image data to paper. To put it more specifically, the photoreceptor drum charged by a charging device is exposed to the light corresponding to the image by the exposure apparatus so that an electrostatic latent image is formed. Then the toner charged by a development apparatus is attached thereto so as to cause development. This toner image is transferred onto the transfer belt in the primary step, and is then transferred from the transfer belt onto the paper medium in the secondary step. Further, the toner image is fixed onto a paper medium by the fixing apparatus. If required, folding, book binding and stapling operations are performed.

The first line interface section 27 constitutes an interface for connection with the first line 50, and communicates with the print controller 30 in conformity to the PCI standards and others.

The second line interface section 28 is an interface of the NIC or modem for connection with the second line 60, and communicates with the client 40 and print controller 30 in conformity to the Ethernet (registered trademark) standards.

In FIG. 1, the image forming system 10 is made up of an image forming apparatus 20, print controller 30 and client 40. The characteristics of the present invention are found in the control between the image forming apparatus 20 and print controller 30. When the print job stored in the storage section 32 of the print controller 30 is executed, or printing is performed using the image data, the image forming system 10 can be made up of the image forming apparatus 20 and print controller 30, as shown in FIG. 2. Further, in FIGS. 1 and 2, the image forming apparatus 20 and print controller 30 are shown as separate structures. However, the main body 20a and print controller 30 can be incorporated in the image forming apparatus 20, as shown in FIG. 3.

FIG. 4 shows the basic configuration of the image forming apparatus 20 and print controller 30. It is only required that they are connected via the first line 50 and second line 60, the print controller 30 has a Web server function, and the image forming apparatus 20 has a Web browser function.

Referring to the flow chart of FIG. 5, the following describes the operation of the print controller 30 using the image forming system 10 of the aforementioned configuration at the time of initial setting. It is assumed that the image forming apparatus 20 is connected to the second line 60, and the network setting thereof has already been terminated. It is also assumed that the screen data for initial setting is stored into the screen data storage section 23 of the image forming apparatus 20 in advance.

In the first place, when the second line interface section 34 of the print controller 30 is connected to the second line 60, the controller 21 of the image forming apparatus 20 detects the connection of the print controller 30 in Step S101, and checks whether or not the IP address is set on the print controller 30.

If the IP address is set, the Step S106 is skipped. If the IP address is not set, initial setting starts so that the print controller 30 can be used on the second line 60.

To put it more specifically, in Step S103, the controller 21 references the setting information of the image forming apparatus 20 and calculates the network setting information (e.g., IP address, netmask, default gateway, DNS (Domain Name System) server) suitable for the print controller 30.

Then in Step S104, the controller 21 controls the display controller 24, which reads the screen data for initial setting from the screen data storage section 23, and allows the display operation section 25 to display the aforementioned network setting information. This information is verified by the user. If the aforementioned network setting information is satisfactory, the controller 21 sends the aforementioned network setting information, information of the image forming apparatus 20 stored in the storage section 22 in advance (e.g., ID information) and user information to the print controller 30 via the first line 50 in Step S105.

The above-mentioned processing enables network setting of the print controller 30. The present invention is further characterized in that the Web page prepared in the server inside the print controller 30 can be browsed using the Web browser of the image forming apparatus 20 via the second line 60. The Web browser is required to minimize the impact on the operation of the image forming apparatus 20. To meet this requirement, when the Web page provided by the Web server of the print controller 30 is created, the major emphasis is to be placed on ensuring compatibility with the Web browser of the image forming apparatus 20, rather than on ensuring conformance to the Web standards.

In this example, the controller 21 sends the Web browser function information (e.g., tag, image format and CGI information that can be represented by the Web browser) to the print controller 30 via the first line 50 in Step S106.

In Step S107, the print controller 30 receives network setting information, information of the image forming apparatus 20, user information, Web browser function information and others from the image forming apparatus 20 via the first line 50.

In Step S108, the controller 31 sets the network according to the network setting information having been received, so that the print controller 30 can be used on the second line 60.

In Step S109, the controller 31 (Web server) creates the screen data (Web page) for controlling the print controller 30 according to the Web browser function information having been received, wherein this screen data is suitable for display on the Web browser of the image forming apparatus 20.

There is no particular restriction to the structure of this Web page. It is preferred that drawing should be enabled only by the drawing function of the display operation section 25 of the image forming apparatus 20. It is also preferred to use a flexible structure in such a way as to be compatible with the extension of functions by improvement of the Web browser version. The Web page is preferred to allow the data capacity to be minimized. For example, for selectable items, use of the radio button configuration more effectively reduces the amount of modifying the drawing than use of the pull-down menu configuration, and therefore, more effectively reduces the impact on the operation of the image forming apparatus 20.

Referring to the flow chart of FIG. 6 and screen configuration example of FIG. 6, the following describes the operation of controlling the print controller 30 subsequent to termination of the initial setting of the print controller 30:

If there is a need of controlling the print controller 30, for example, to check the print job setting or to improve the version of the program of the print controller 30, the controller 21 (Web browser) of the image forming apparatus 20 converts the IP address of the print controller 30 into the address conforming to the URL (Uniform Resource Locator) in Step S201, and accesses the Web server of the print controller 30. In Step S202, the Web page is obtained from the Web server via the second line 60.

In Step S203, the controller 21 controls the display controller 24, and the display controller 24 allows the display operation section 25 to display the Web page having been obtained. There is no particular restriction to the method of displaying the Web page. For example, the Web page is preferably displayed in the area within the framework provided on the normal screen, as shown in FIG. 7, rather than over the entire surface of the display operation section 25. This will provide better external appearance and more enhanced conformance with the screen.

As described above, the Web browser of the image forming apparatus 20 has limited functions. Should access made to the Web site of a complicated structure on the Internet, functions will be read and discarded if not supported. This provides an advantage of eliminating the possibility of poor security that is considered as characteristic of the conventional Web browser.

When the drawing functions (e.g., graphic drawing and font drawing) of the display operation section 25 of the image forming apparatus 20 are used to create a Web browser, application of graphic representation and font data is enabled. This permits the Web browser resource to be minimized so that high-speed operation can be performed.

After that, in Step S204, predetermined operations are performed on the Web browser, and the print controller 30 is placed under control.

For the print controller 30 having been connected once, it is preferred that the network setting information, Web browser function information and ID information should be stored in the nonvolatile memories of both the image forming apparatus 20 and print controller 30, so that use of such information is enabled when reconnected. Further, when the Web page is created in the print controller 30, the Web page having been created is stored in the storage section 32 of the print controller 30 and can be used as a cache, whereby the processing load of the print controller 30 can be reduced.

As described above, the print controller 30 and image forming apparatus 20 are connected not only via the first line 50 such as a dedicated bus but also via the second line 60 such as LAN or WAN. The Web server is mounted on the print controller 30, and the Web browser is mounted on the image forming apparatus 20. The Web page created in the print controller 30 is displayed on the Web browser of the image forming apparatus 20 through the second line 60, so that the print controller 30 can be controlled. This arrangement ensures easy control of the print controller 30, without the printing operation in the image forming apparatus 20 being interrupted.

In the aforementioned example, the display of the screen for controlling the print controller 30 has been described. Without being restricted thereto, the present invention is applicable to desired control between the image forming apparatus 20 and print controller 30 using the first line 50 in the similar manner.

The present invention is applicable to an image forming system including an image forming apparatus and print controller, and a control method in this image forming system.

Efficient printing operations are ensured by the image forming system and control method of the present embodiment.

This is because the image forming apparatus and print controller are connected by two lines—the first line such as a dedicated bus for transferring image data at the time of printing, and the second line such as LAN and WAN for receiving a print job from a client. After termination of the initial setting for enabling use of the print controller over the second line, the second line is used to control the print controller. This arrangement prevents contention between the signal (command code) for controlling the print controller, and the image data. Further, the second line is used to transfer the screen data for controlling the print controller. Accordingly, contention between the screen data and image data can also be avoided.

Effective control of the print controller is ensured by the image forming system and control method of this embodiment.

This is because the screen is created by the print controller, and the screen data is acquired through the second line using the Web browser function of the image forming apparatus, and therefore, the screen suitable for each print controller can be easily displayed. Further, the screen suitable for each print controller need not be created by the image forming apparatus 20. This arrangement minimizes the number of man hours for designing a screen, suppresses generation of bugs due to the difference of the program interface, ensures easy modification of the screen subsequent to shipment, and eliminates the need of re-making the screen when the print controller 30 is modified.

What is claimed is:

1. An image forming system comprising:
   a print controller which generates image data based on a print job; and
   an image forming apparatus which controls the print controller and performs a printing operation based on the image data,
   wherein the image forming apparatus comprises:
   a first interface section which connects with a first line for receiving the image data from the print controller;
   a second interface section which connects with a second line with which a client can connect, the second line for communicating with the print controller; and
   a control section which executes,
      a first control which, through the first line, executes an initial setting for enabling the print controller to be used through the second line,
      a second control which executes a control of the print controller, after the initial setting is executed, through the second line, wherein the image forming apparatus receives the image data through the first line after the initial setting is executed, and
   wherein the control section simultaneously receives the image data through the first line and executes the second control of the print controller through the second line after the initial setting is executed.

2. The image forming system described in claim 1,
   wherein the print controller has a function as a Web server which provides a Web page for controlling the print controller;
   the image forming apparatus has a function as a Web browser which obtains and displays the Web page;
   the initial setting is executed through the first line by a command sent from image forming apparatus; and
   the control, after the initial setting, is executed through the second line on the Web page which the Web browser has obtained from the Web server.

3. The image forming system described in claim 2,
   wherein the image forming apparatus sends to the print controller, information which specifies a content which can be displayed on the Web browser;
   the print controller generates the Web page suitable for being displayed on the Web browser of the image forming apparatus based on the information.

4. The image forming system described in claim 1, wherein the first line is a dedicated bus and the second line is an internet line.

5. The image forming apparatus described in claim 1, wherein when the image forming apparatus receives the image data through the first line after the initial setting is executed, the control of the print controller is not executed through the first line.

6. A control method of an image forming system which comprises a print controller for generating image data based on a print job; and
   an image forming apparatus which controls the print controller and performs a printing operation based on the image data, the method comprising:
   connecting the print controller with the image forming apparatus through a first line which transfers the image data and a second line which a client who sends the print job can connect;
   executing an initial setting by using the first line for enabling the print controller to be used through the second line;
   executing a control of the print controller, after the initial setting, by using the second line, and allowing the image forming apparatus to receive the image data through the first line after the initial setting is executed; and
   wherein the image forming apparatus simultaneously receives the image data through the first line and executes the control of the print controller through the second line after the initial setting is executed.

7. The control method described in claim 6, comprising:
   allowing the print controller to function as a Web server which provides a Web page for controlling the print controller; and
   allowing the image forming apparatus to function as a Web browser which obtains and displays the Web page,
   wherein the initial setting is executed by a command sent through the first line from image forming apparatus, and
   the control, after the initial setting, is executed on the Web page which the Web browser has obtained through the second line from the Web server.

8. The control method described in claim 7,
   wherein the image forming apparatus sends to the print controller information which specifies a content which can be displayed on the Web browser; and
   the print controller generates the Web page suitable for displaying on the Web browser of the image forming apparatus based on the information.

9. The control method described in claim 6,
   wherein the first line is a dedicated bus and the second line is an internet line.

10. The control method of an image forming system described in claim 6, wherein when the image forming apparatus receives the image data through the first line after the initial setting is executed, the control of the print controller is not executed through the first line.

11. An image forming apparatus which connects with a print controller which generates image data based on a print job, performs a printing operation based on the image data, and controls the print controller, the image forming apparatus comprising:

a first interface section which connects with a first line for receiving the image data from the print controller;

a second interface section which connects with a second line with which a client can connect, the second line for communicating with the print controller; and a control section which executes, a first control which executes, through the first line, an initial setting which enables the print controller to be used through the second line, a second control which executes, through the second line, a control of the print controller after the initial setting is executed, wherein the image forming apparatus receives the image data through the first line after the initial setting is executed, and wherein the control section simultaneously receives the image data through the first line and executes the second control of the print controller through the second line after the initial setting is executed.

12. The image forming apparatus described in claim 11, wherein the print controller has a function as a Web server which provides a Web page for controlling the print controller;

the image forming apparatus has a function as a Web browser which obtains and displays the Web page;

the initial setting is executed through the first line by a command sent from image forming apparatus; and the control, after the initial setting, is executed through the second line on the Web page which the Web browser has obtained from the Web server.

13. The image forming apparatus described in claim 12, wherein the image forming apparatus sends, to the print controller, information which specifies a content which can be displayed on the Web browser;

the print controller generates the Web page suitable for displaying on the Web browser of the image forming apparatus based on the information.

14. The image forming apparatus described in claim 11, wherein the first line is a dedicated bus and the second line is an internet line.

15. The image forming apparatus described in claim 11, wherein when the image forming apparatus receives the image data through the first line after the initial setting is executed, the control of the print controller is not executed through the first line.

* * * * *